United States Patent [19]

Föhl

[11] 4,378,947
[45] Apr. 5, 1983

[54] REFLECTION FITTING FOR THE SAFETY BELT OF RESTRAINING SYSTEM

[75] Inventor: Artur Föhl, Schorndorf, Fed. Rep. of Germany

[73] Assignee: Repa Feinstanzwerk GmbH, Alfdorf, Fed. Rep. of Germany

[21] Appl. No.: 203,890

[22] Filed: Nov. 4, 1980

[30] Foreign Application Priority Data

Nov. 8, 1979 [DE] Fed. Rep. of Germany ....... 2945174

[51] Int. Cl.³ .......................................... A62B 35/02
[52] U.S. Cl. ................................ 280/808; 24/163 R
[58] Field of Search ............ 280/808, 801; 24/163 R, 24/163 FC, 164

[56] References Cited

U.S. PATENT DOCUMENTS

| | | | |
|---|---|---|---|
| 3,959,855 | 6/1976 | Fisher | 280/808 |
| 4,023,826 | 5/1977 | Kokubo et al. | 24/163 R |
| 4,102,020 | 7/1978 | Lindblad | 280/808 |
| 4,142,274 | 3/1979 | Scholz et al. | 280/808 |

FOREIGN PATENT DOCUMENTS 2026307  2/1980  United Kingdom ............... 280/808

*Primary Examiner*—Robert R. Song
*Attorney, Agent, or Firm*—Herbert L. Lerner; Laurence A. Greenberg

[57] ABSTRACT

Deflection fitting for a safety belt of a restraining system having a fitting plate with guide slot and cross bar. A sleeve-like deflection element has a longitudinal slit to permit sliding onto the cross bar. The element may then be rotated 180°. Plug-like locking part has a longitudinal slot fitting the cross bar on one side and a key which fits into the longitudinal slit of the deflection on the other side. Pressing the plug-like locking part into the sleeve opening of the deflection element locks the deflection element to the cross bar.

10 Claims, 7 Drawing Figures

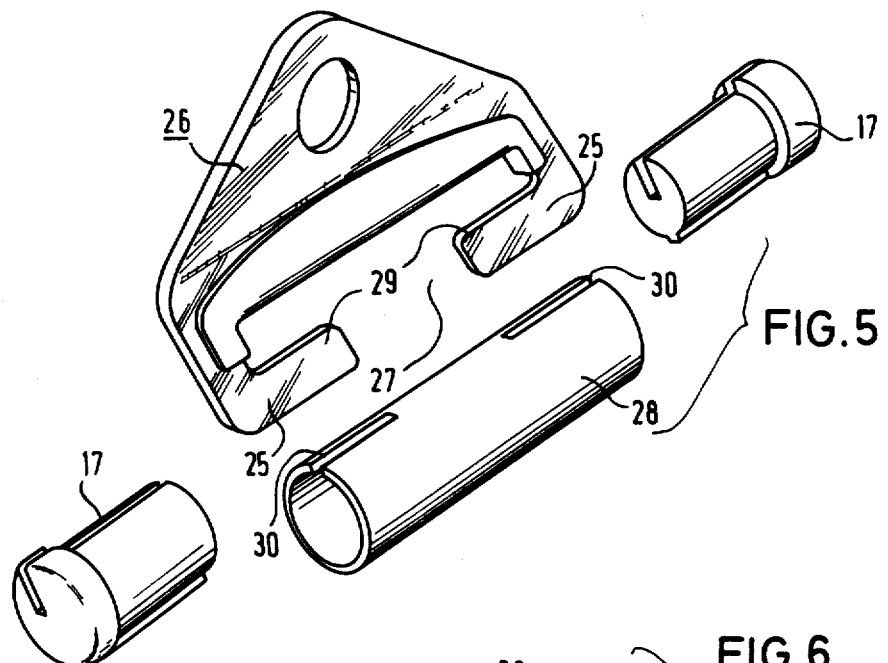
FIG.5
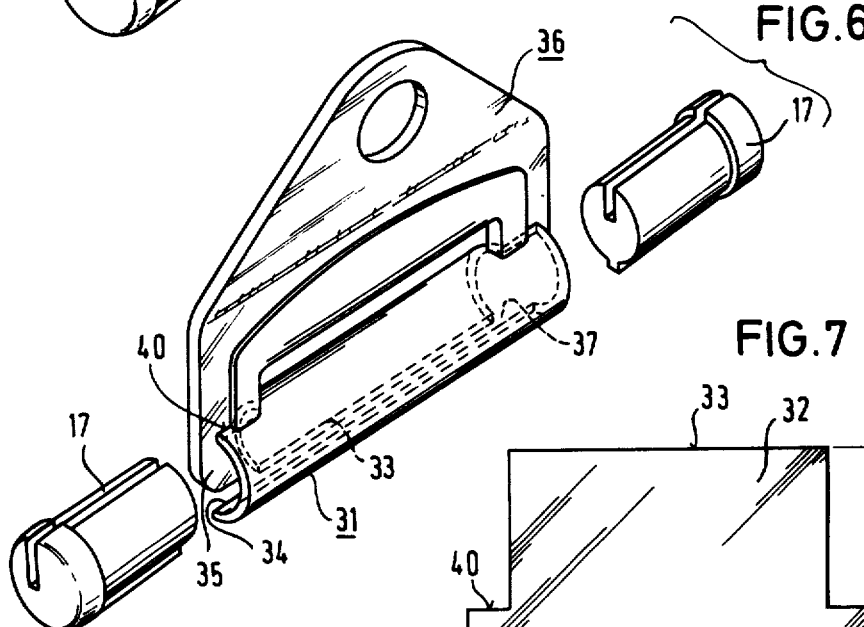
FIG.6
FIG.7
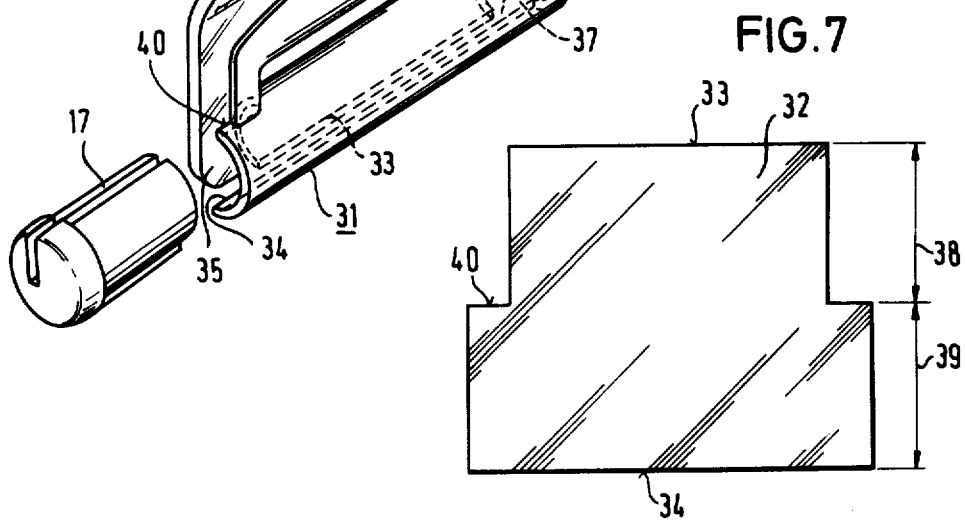

REFLECTION FITTING FOR THE SAFETY BELT OF RESTRAINING SYSTEM

BACKGROUND OF THE INVENTION

1. Field of the Invention

This invention relates to a deflection fitting for the safety belt of a restraining system, especially for motor vehicles, with a fitting plate having a guide slot for the belt band, a cross bar around which the belt is partly wrapped and a deflection element having a rounded roll-off surface for the belt band which can be mounted on and secured to the cross bar.

2. Background of the Invention

In the known safety belt arrangements the belt is guided at the deflection points over a fitting which is hingeably fastened to the vehicle frame. The fitting is a stamped part with a straight cross bar in shape similar to a chain link, over which the belt band is guided. The problem here is the fact that due to the relatively small deflection radius of the cross bar edge very strong twisting forces occur when the belt is under load, connected with very high friction forces, and a very high area loading per unit roll-off area. These disadvantages are avoided in a known deflection fitting by the feature that a deflection element with a rounded contact surface for the safety belt is form-fitted onto the cross piece of a fitting plate made as a metal stamping. In this manner a relatively large deflection radius and optimized friction and pressure conditions are obtained.

SUMMARY OF THE INVENTION

The instant invention has the objective to improve a deflection fitting of the type mentioned with respect to its assembly and its mechanical strength.

With the foregoing and other objects in view, there is provided in accordance with the invention a deflection fitting for a safety belt of a restraining system, especially for motor vehicles, comprising a fitting plate, a guide slot in the fitting plate for passage of the safety belt therethrough, a cross bar of the fitting plate for support of the safety belt, a sleeve-like deflection element with a rounded roll-off surface for the safety belt and having at least one longitudinal slit to permit sliding the deflection element onto the cross bar and mounted thereon, at least one plug-like locking part with one side of the locking part having a longitudinal slot fitting the cross bar, and the other side of the locking part having a longitudinal key which fits in the longitudinal slit of the deflection element, said plug-like locking part when pressed form- or force fittingly into the sleeve opening of the sleeve deflection element locks the deflection element to the cross bar.

Other features which are considered as characteristic for the invention are set forth in the appended claims.

Although the invention is illustrated and described herein as embodied in a deflection fitting for the safety belt of a restraining system, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 5 is a deflection fitting according to the invention in another form shown in exploded representation;

FIG. 6 is a further form of a deflection fitting according to the invention;

FIG. 7 is the deflection element of the deflection fitting according to FIG. 6 as stamped sheet metal blank.

DETAILED DESCRIPTION OF THE INVENTION

Figure 1:
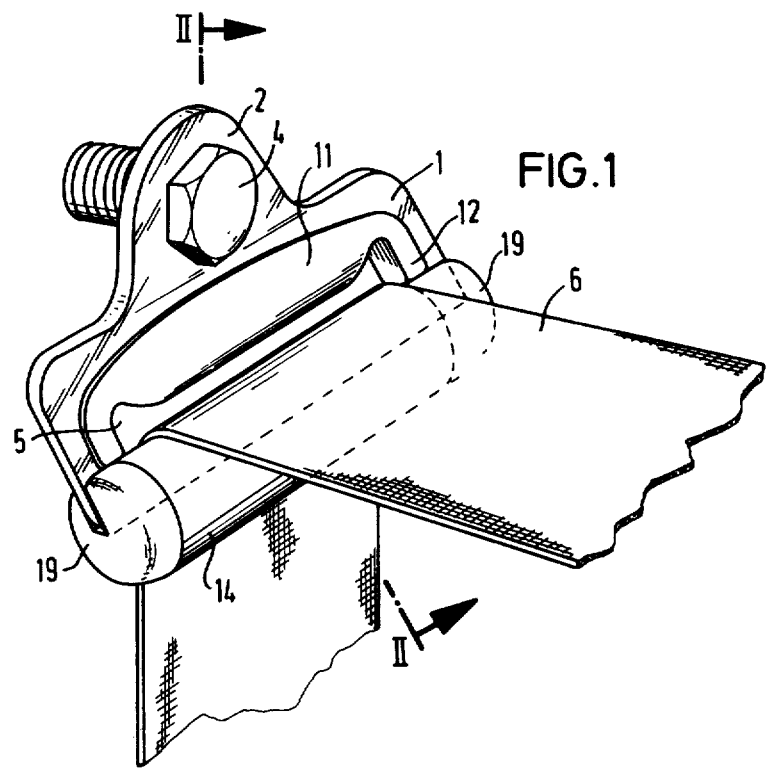
FIG. 1 is a perspective, overall view of the deflection fitting according to the invention, in which are shown a chain-linked-shaped plate, an angled-off fastening lug, a guide slot for the belt, a belt protector, a deflection element mounted on the cross bar of the plate, and a safety belt around the deflector element.

The sleeve-like deflection element has at least one longitudinal slit, by which it can be pushed onto the cross piece or cross bar. Connection between the cross piece and the deflection element is provided by at least one plug-like locking part which can be axially pressed form- or force fitted into the sleeve-opening of the deflection element. The locking part has on one side an elongated slot for fitting the cross piece, and the other side has a key which fits into the longitudinal slit of the deflection element. In this manner the cross piece of the chain-link shaped fitting plate, which is preferably a simple stamping, is surrounded by a closed deflection- or roll-off surface, whereby optimal friction and pressure conditions between belt band and roll-off surface can be obtained, and also the esthetic appearance of the deflection fitting is improved. The assembly, i.e. the fitting together of plate fitting and deflection element, becomes very simple, by just pushing the sleeve-like or tubular deflection element onto the cross piece, and rotating it 180°. The deflection element is strongly locked and mechanically connected with the cross bar of the fitting plate by the simple expedient, as stated before, of pressing-in the locking parts axially from the sides. The longitudinal key is so designed that it is in line with the surface of the deflection element. Material for the locking part is preferably an elastic synthetic material. The deflection element is preferably made of metal.

According to a further advantageous embodiment of the invention, the locking parts can be pressed from opposite sides into the sleeve-opening of the deflection element, and have a length corresponding to approximately half the length of the longitudinal slit of the deflection element. The locking parts are desirably provided with nail-head like enlargements at their outer ends. By dividing the locking parts in two halves the pressure required for the assembly of the deflection fitting is reduced, nevertheless a reliable locking of the deflection element is assured. By the nail-head like enlargements of the locking parts one obtains a continuous and attractive-looking transition from the rounded roll-off surface of the deflection element to the surfaces of the fitting plate.

A further advantageous embodiment of the invention is obtained by bordering the guide slot of the fitting plate by two longitudinal edges which are essentially parallel to each other. The edge belonging to the cross bar is covered by the deflection element, while a U-shaped belt protector can be pushed onto the other longitudinal edge. The belt protector is preferably provided with U-shaped legs extending to the sides which cover the side edges of the guide slot of the fitting plate up to the roll-off surface of the deflection element. This belt protector prevents the belt band from coming into contact with the relative sharp edge of the fitting plate which, for example, may be a stamped part, or from touching adjacent bordering edges. Thus, the whole guide slot is lined by curved surfaces with low friction.

Further advantageous features of the invention are explained with the aid of the typical emobidments shown in the drawings.

Figure 2:
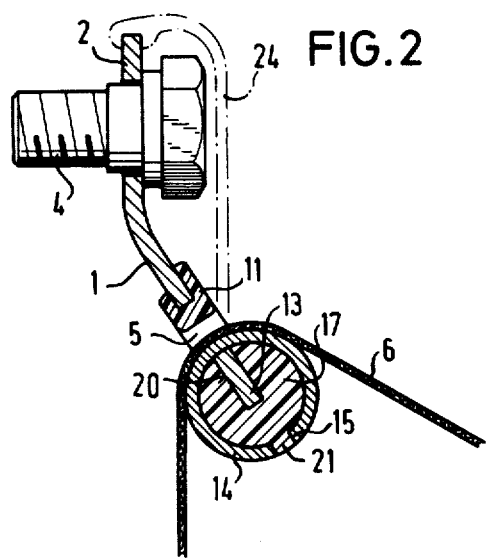
FIG. 2 is a sectional side view of the deflection fitting according to FIG. 1.

The deflection fitting shown in the figures comprises a chain-link-shaped plate 1, made as a metallic, stamped part, having a slightly angled-off fastening lug 2, which is provided with a hole 3 for a screw fastener 4, by which the fitting plate 1 can be secured, for example, to the frame of a motor vehicle. The fitting plate 1 is provided with a guide slot 5 for the belt band 6 of a safety belt which is a part of a not further shown or explained known restraining system. The guide slot 5 which is widened at its sides is essentially bordered by two longitudinal edges 7, 8 which are parallel to each other, and two side edges 9 and 10. A belt protector 11, for example, made of plastic, can be provided which fits onto the upper longitudinal edge 7 and also onto the side edges 9 and 10 of the guide slot. Belt protector 11 has, for this purpose, a U-shaped profile, and as shown in the plan view, has at the sides U-shaped extending legs 12. A sleeve- or tube-shaped, metallic deflection element 14 can be placed onto the cross bar 13 of the plate 1 which is bordered by the other longitudinal edge 8. The sleeve-shaped deflection element 14 has, for this purpose, a longitudinal slit 15 whose width, i.e. clearance, is greater than the plate thickness of the fitting plate 1, and also the diameter of the sleeve opening 16 is greater than the width of the cross bar 13 to provide clearance therefor. The deflection element 14 whose surface provides a curved roll-off area for the belt 6, is to be rotated so that its longitudinal slit 15, as shown in the drawing, lies below the cross bar 13 (FIG. 2). The two locking parts are designated by 17. They consist of an elastic plastic material, with each locking part 17 having a cylindrical shaft 18 and a nail-head-like enlarged portion 19. The diameter of the shaft 18 can be slightly greater than the width of the sleeve opening 16 to insure a tight fit. Each plug-like locking part 17 is provided with a longitudinal slot 20 extending along its full length, corresponding to approximately the half length of the cross bar, and has, on the other side, a longitudinal key 21 along the shaft 18.

Figure 3:
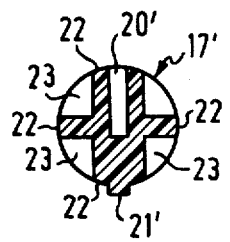
FIG. 3 is a sectional view in profile of a slightly modified locking element for the deflection fitting according to FIGS. 1 and 2.
Figure 4:
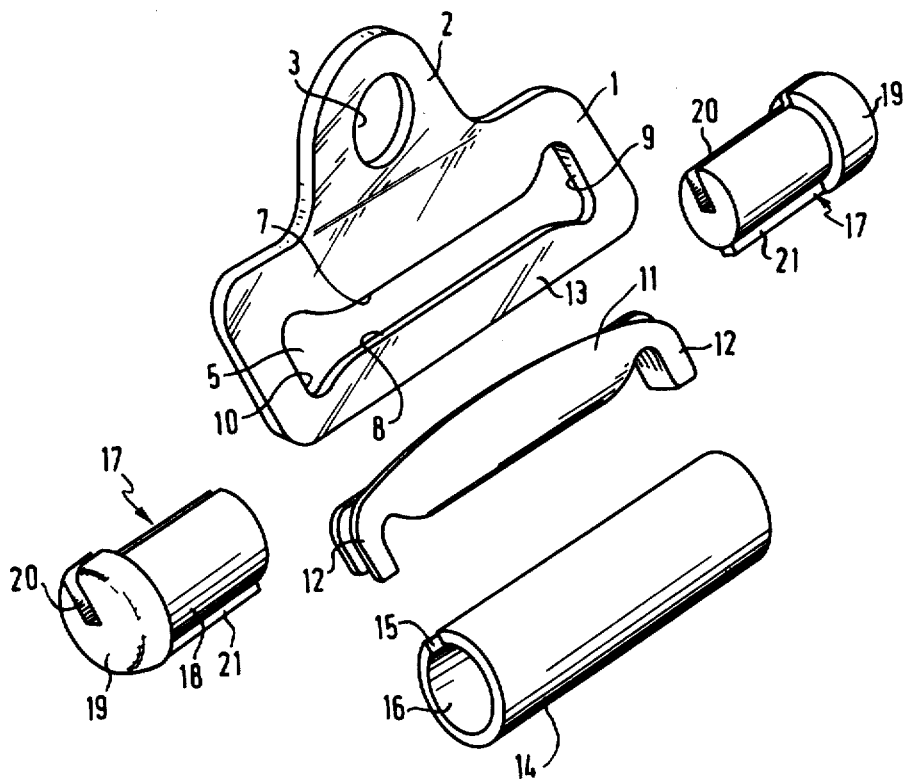
FIG. 4 is a perspective, exploded representation of the various parts of the deflection fitting according to the invention.

As clearly shown by FIG. 3, the surface of the locking part 17' can be interrupted in the region of the shaft by several strip-like surface regions 22, and by the recesses 23 disposed between the latter. Longitudinal slot is designated by 20', and longitudinal key by 21'. Such locking parts can readily be manufactured by plastic press methods or the like.

In the assembly of the deflection fitting whose individual parts were explained, the belt protector 11 is first pushed onto the upper longitudinal edge 7 of the fitting plate 1, form- and force fittingly, and thereby secured. Thereafter, the deflection element 14 is pushed with its longitudinal slot 15 onto the cross bar 13, and then rotated 180°, so that the longitudinal slit 15 is positioned below the edge of the bar 13. Now, the plug-like locking parts 17 are pressed axially from two opposite sides into the sleeve-openings 16, in such a manner that the longitudinal slots 20 of the locking parts 17 engage a part of the cross bar 13. With the pressing of the locking parts 17 into the sleeve openings 16, the longitudinal key 21 of each locking part 17 is simultaneously pressed into the longitudinal slit 15 of the deflection element 14. The width of the longitudinal key 21 can be slightly greater than the width of the longitudinal slot 15, so that the edges of the longitudinal slot press spring-like onto the key 21, thereby providing a very stable and reliable lock of the locking parts 17 and the deflection element 14, and also a fixed mechanical connection between the cross bar 13 and the deflection element 14. This mechanical connection is clearly shown in FIG. 2. After pressing the locking parts 17 into the sleeve opening 16, as shown in FIG. 1, the rounded, enlarged portions 19 of the locking parts 17 make continuous transitions from the round roll-off surface of the deflection element 14 to the adjacent surfaces of the fitting plate 1. The height of the longitudinal key 21 of the locking parts 17 is chosen so that the outer limit of the keys 21 is aligned, i.e. flush with the surface of the deflection element 14. Finally, the length of the legs 12 of the belt protector 11 is so chosen that these legs 12 extend to the roll-off surface of the deflection element 14. A cover 24 as indicated by dotted lines in FIG. 2, may be push-fitted onto at least a part of the fitting plate 1.

In the embodiment according to FIG. 5, the cross bar 25 of the fitting plate 26 has a median discontinuation 27. The tube-shaped deflection element 28 is provided with two longitudinal slits 30 corresponding to the distances of the cross-bar stumps 29, by which the deflection element 28 is pushed onto the cross bar 25, and rotated around 180°. There, the locking parts 17 are pressed in from the sides.

In contrast to the embodiment above, the deflection element 31, according to FIG. 6, is manufactured from a stamped sheet metal blank shown as detail 32, which is rolled into a sleeve in such a way that the edges 33 and 34 have a distance from each other corresponding to the width of the cross bar 35 of the fitting plate 36, and form a longitudinal slit 37. One arc-portion 38 has a width corresponding to the length of the cross bar 35 in the region of the guide slot 5 (compare FIG. 1), while the width of the second arc-portion 39 corresponds approximately to the width of the fitting plate 36. Thereby, the deflection element 31 can be pushed in the described manner onto the cross bar 35, be rotated until the edge 40 contacts the fitting plate 36, and again can be secured by the locking parts 17.

I claim:

1. Deflection fitting for a safety belt of a restraining system, especially for motor vehicles, comprising a fitting plate, a guide slot in the fitting plate for passage of the safety belt therethrough, a cross bar of the fitting plate for support of the safety belt, a sleeve-like deflection element with a rounded roll-off surface for the safety belt and having at least one longitudinal slit to permit sliding the deflection element onto the cross bar and, after said deflection element is pushed onto the cross bar, the deflection element is rotated in such a manner that its longitudinal slit is positioned at a side of the cross bar which is away from the guide slot of the fitting plate, at least one plug-like locking part with one side of the locking part having a longitudinal slot fitting the cross bar, and the other side of the locking part having a longitudinal key which fits in the longitudinal slit of the deflection element, said plut-like locking part when pressed form- or force fittingly into the sleeve opening of the sleeve deflection element locks the deflection element to the cross bar.

2. Deflection fitting according to claim 1, wherein the deflection element has a continuous sleeve portion and two longitudinal slots at the sides, and wherein the cross bar has a discontinuation with cross bar stumps, through which said deflection element, which is provided with said continuous sleeve portion and two longitudinal slots at the sides, can be pushed onto said cross bar stumps.

3. Deflection fitting according to claim 2, wherein after said deflection element is pushed onto the cross bar stumps, the deflection element is rotated in such a manner that its longitudinal slit is positioned at the side of the cross bar stumps which is away from the guide slot of the fitting plate.

4. Deflection fitting according to claim 1, wherein said deflection element is a sleeve-like rolled plate whose edges are spaced at a distance from each other to form said longitudinal slit.

5. Deflection element according to claim 4, wherein said deflection element in cross-section has one arc-portion approximately corresponding to half the sleeve periphery with a width corresponding to the length of the cross bar and a second arc-portion with a width corresponding to the width of the fitting plate.

6. Deflection fitting according to claim 5, wherein said locking parts are pressed into the sleeve-openings from opposite sides, and wherein the length of each locking part corresponds to half of the longitudinal slit.

7. Deflection fitting according to claim 1 or 6, wherein each said locking part is provided at its outer end with an enlarged, nail-head-like portion.

8. Deflection fitting according to claim 1 or claim 6, wherein each locking part has its surface interrupted several times by strip-like surface regions and adjacent recesses.

9. Deflection fitting according to claim 1, wherein said guide slot of the fitting plate is bordered by two longitudinal edges which are essentially parallel to each other with one longitudinal edge of the cross bar covered by said deflection element, and the other longitudinal edge covered by a U-shaped belt protector which can be pushed onto the other longitudinal edge.

10. Deflection fitting according to claim 9, wherein said belt protector is provided with U-shaped legs extending to the sides which cover the side edges of the guide slot of the fitting plate up to the roll-off surface of the deflection element.

* * * * *